US006234378B1

(12) United States Patent
Ford et al.

(10) Patent No.: US 6,234,378 B1
(45) Date of Patent: May 22, 2001

(54) SOLID LIQUID INTER-DIFFUSION BONDING FOR RING LASER GYROSCOPES

(75) Inventors: Carol M. Ford; William P. Platt, both of Columbia Heights, MN (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/332,230

(22) Filed: Jun. 14, 1999

(51) Int. Cl.$^7$ .......................... B23K 20/00; B23K 28/00; B23K 31/02
(52) U.S. Cl. ...................... 228/193; 228/120; 228/122.1; 228/262.6; 219/85.1; 219/78.02; 219/118
(58) Field of Search ................ 219/85.1, 78.02, 219/118; 228/193, 120, 122.1, 262.6

(56) References Cited

U.S. PATENT DOCUMENTS

| 3,599,123 | * 10/1971 | Krause ................... 333/30 R |
| 4,273,282 | 6/1981 | Norvell et al. .............. 228/116 |
| 4,336,982 | 6/1982 | Rector, Jr. ................. 350/358 |
| 4,432,660 | 2/1984 | Norvell et al. .............. 403/29 |
| 4,447,754 | 5/1984 | Wagers .................... 310/313 R |
| 4,595,377 | 6/1986 | Norvell .................... 445/28 |
| 4,865,436 | 9/1989 | Ahonen et al. .............. 350/487 |
| 5,090,819 | 2/1992 | Kapitulnik ................. 374/176 |
| 5,106,009 | 4/1992 | Humpston et al. ............ 228/195 |
| 5,234,152 | 8/1993 | Glaeser .................... 228/121 |
| 5,448,014 | 9/1995 | Kong et al. ................ 174/52.3 |

FOREIGN PATENT DOCUMENTS 12095604  10/1982  (GB) ................... B23K/20/00

OTHER PUBLICATIONS

Article by L. Bernstein and H. Bartholomew entitled "Applications of Solid–Liquid Interdiffusion (SLID) Bonding in Integrated–Circuit Fabrication" pp 405–412, published in Transactions of the Metallurgical Society of AIME, vol. 236, Mar. 1966.

* cited by examiner

Primary Examiner—Patrick Ryan
Assistant Examiner—Colleen Cooke
(74) Attorney, Agent, or Firm—Kris T. Frederick

(57) ABSTRACT

A method for bonding a gyroscope component to a gyroscope body using the solid liquid Inter Diffusion (SLID) process. The resulting bond structure has a larger operating range than the bonding-materials used to create to bond. Mating material layers may be added to the bond to improve bonding between the bonding materials and the component and between the bonding materials and the gyroscope body.

16 Claims, 2 Drawing Sheets

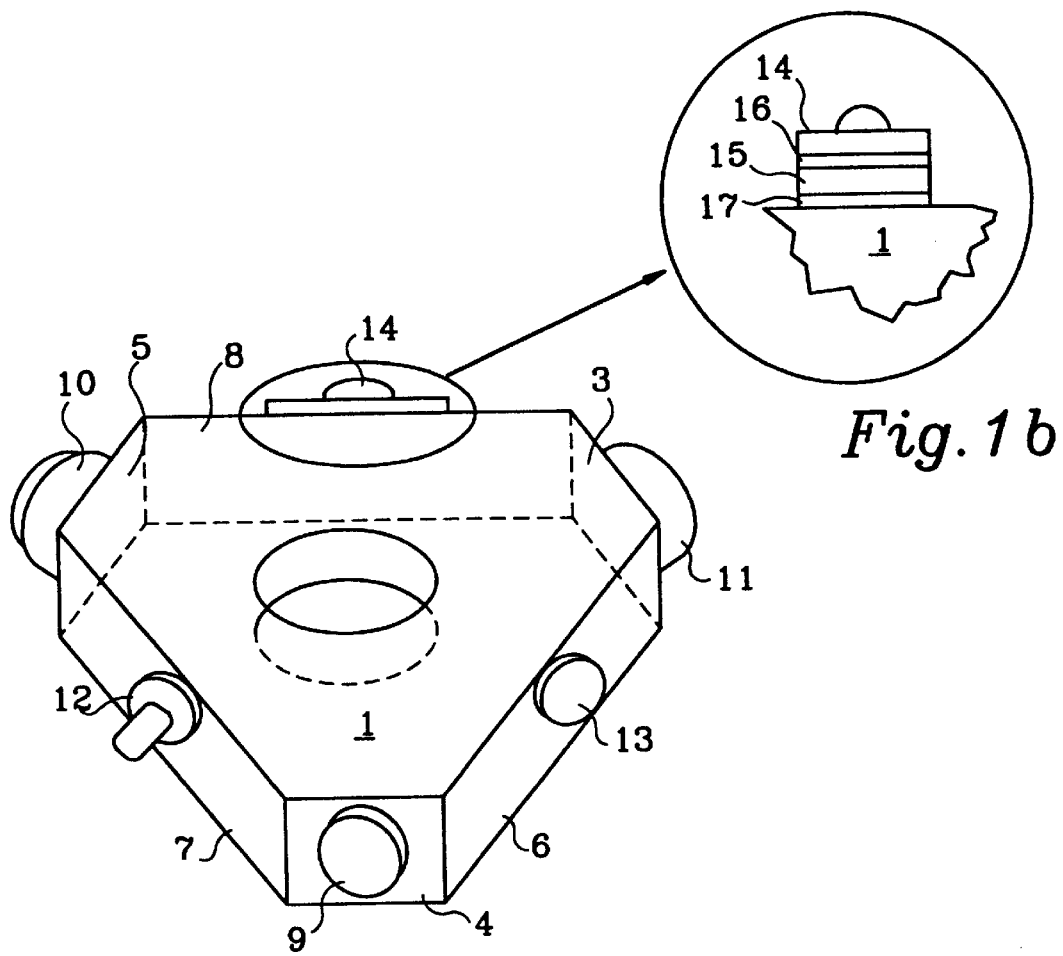
*Fig. 1b*
*Fig. 1a*
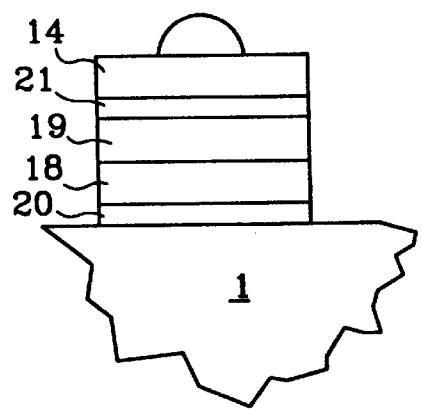
*Fig. 1c*

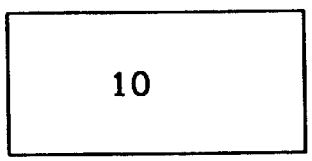
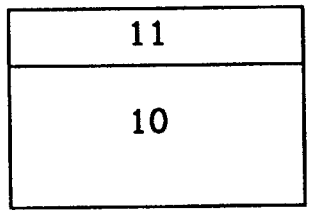
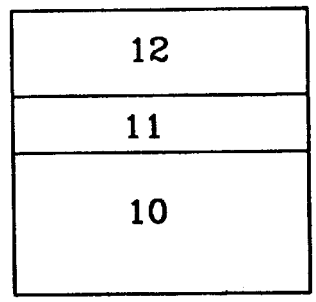
*Fig.2a*          *Fig.2b*          *Fig.2c*
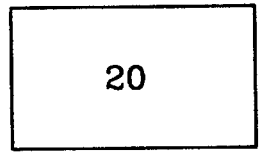
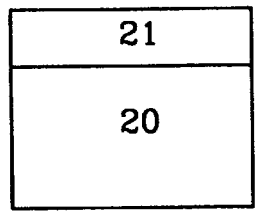
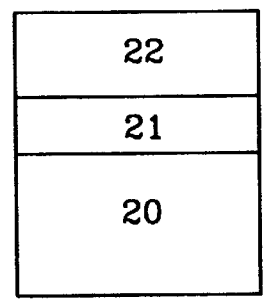
*Fig.3a*          *Fig.3b*          *Fig.3c*
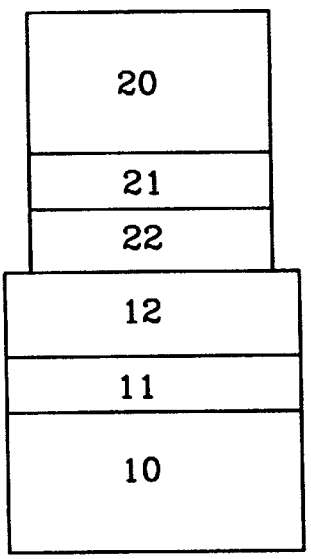
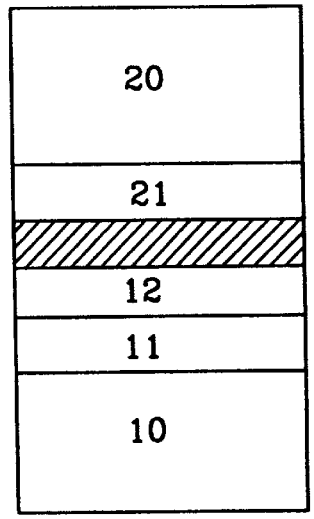
*Fig.4a*          *Fig.4b*

SOLID LIQUID INTER-DIFFUSION BONDING FOR RING LASER GYROSCOPES

BACKGROUND OF THE INVENTION

This invention relates generally to bonding methods for use with materials such as glass, quartz, metal, ceramic and the like. More specifically, the invention relates to a method for bonding ring laser gyroscope components to the gyroscope body.

In one common form of compact ring laser gyroscope, a block comprising a glass, quartz, ceramic or similar material and having a low coefficient of thermal expansion (CTE) forms the body of the gyroscope. A number of components typically composed of glass or metal, such as electrodes, mirrors, and readout apparatus, are attached to the gyroscope body. Sealed passages in the body allow optical communication among the various components. The passages of the gyroscope body are filled with a lazing gas which lazes upon current being applied to the gyroscope.

A cathode and two anode components are used to create the beams of laser light traveling in opposing directions through the gyroscope body. The cathode and anodes may be composed of aluminum, steel, nickel or other metal which meets the design requirements for the gyroscope. The other components attached to the gyroscope may be glass mirrors, or may be glass-metal components which, for instance, allow adjustment of gyroscope mirror position to improve gyroscope performance.

The life and accuracy of the gyroscope is largely effected by the ability of the components to be properly bonded to the gyroscope body in such a way as to prevent escape of lazing gas, or contamination of the gyroscope passages with foreign gasses. In an ideal case, the seal should be hermetic, meaning that a negligible amount of gas is exchanged between the passages in the gyroscope body and the atmosphere during the life of the gyroscope. Thus the method used to seal the components to the gyroscope body is critical to the performance of the gyroscope.

The bonding method may also affect the operating range of the gyroscope, depending on the conditions under which the bonding materials degrade. Of particular concern are bonding materials having melting temperatures which limit the possible applications of the gyroscope (i.e. oil drilling, high speed/altitude aircraft, etc.) As another concern, the bonding of components to the gyroscope body ideally should not interfere with or alter previously completed processing steps, nor limit subsequent processing steps.

With these considerations in mind, numerous methods of bonding the components to the gyroscope body have been attempted, each with some measure of success. High temperature epoxy for example has been used as an effective material for glass-glass bonds. Indium or other soft metals have typically been popular for glass-metal bonds. Both have been effective in part because they are flexible enough to compensate for the differences in the CTE of the two materials being bonded. Other bonding methods, such as graded bonds and the use of glass frits, which attempt to match the CTE of the two materials to be bonded together, have also been successful.

Unfortunately, the epoxy and soft metal bonding techniques, due to the flexibility of the bond materials, tend to allow outgassing or fail to provide a bond capable of the types of pressures typically desired for high-end gyroscope devices. Indium in particular "squishes" out of the bonding area with repeated use of the device, eventually causing failure of the gyroscope. Neither epoxy or soft metal allow the gyroscope to be operated at high temperatures, since the limit of the gyroscopes range of operation is the melting temperature of the bonding material. In some cases an even lower limit is caused if the bonding material begins to degrade below its melting temperature. These same limits will effect the types of processing the gyroscope may undergo subsequent to formation of the bond.

Glass frits, which are used for bonding two identical materials, or materials with nearly identical CTE's together, require less cleaning and preparation of the bonding surfaces than required when forming indium seals. The use of glass frits is known to produce consistent and inexpensive hermetic seals. Unfortunately, the glass frit bonding process requires an elevated temperature which substantially limits the types of processing which can be done near the area of the bond prior to the bonding process. Furthermore, there is an inverse relationship between frit bonding temperature and the CTE for the frits used, which means that frits with low CTE, near that of the typical gyroscope body materials, have such high processing temperatures that they exceed the thermal limits of the gyroscope body. Thus, use of frits usually introduces a thermal mismatch into the gyroscope since a compromise must be made between bonding temperature and the CTE of the frit.

As a last point, gyroscope construction would be simpler if a single bonding material could be used to bond all components to the gyroscope body. Presently, individual bond techniques are used based on the type of component to be bonded, since no common bonding technique is known for all component types.

SUMMARY OF THE INVENTION

The present invention describes a process for producing a bond structure which allows a ring laser gyroscope to be used at elevated temperatures without bond degradation, and also may be used for all components to be bonded to the gyroscope body. The process has the added advantage that it does not require elevated temperatures or pressures during processing to achieve these results.

In the first and second steps of the applicant's invention, a first bonding material is applied over the mating surface of the gyroscope body and a second bonding material is applied over the mating surface of the component. The bonding materials are chosen so that they will form an alloy when placed in contact at a temperature below the melting temperature of either bonding material, while the alloy created will have a melting temperature above the melting temperature of the lower of either bonding material. In the third step of the applicants' invention the first bonding material layer is contacted to the second bonding material layer at a temperature less than the melting temperature of either bonding material to cause formation of the alloy.

The effectiveness of the process can be improved by forming a mating material layer between the gyroscope body and the first bonding material layer, and between the component and second bonding material layer. The mating material is chosen based on its ability to bond better with the alloy than either the gyroscope body or the component bond with the alloy.

BRIEF DESCRIPTION OF THE DRAWINGS

FIG. 1a shows a gyroscope suited for application of the applicants' invention.

FIG. 1b shows an expanded view of the bond between one of the components and the gyroscope body according to the applicants' invention.

FIG. 1c shows an expanded view of a modified bond between one of the components and the gyroscope body according to the applicants' invention.

FIGS. 2a–2c are process diagrams showing the various stages of one method of processing the substrate according to the applicant's invention.

FIGS. 3a–3c are process diagrams showing the various stages of one method of processing the component according to the applicant's invention.

FIG. 4a shows the critical processing step for the applicants' invention.

FIG. 4b shows the final structure created by the applicants' preferred embodiment.

DETAILED DESCRIPTION OF THE PREFERRED EMBODIMENT

FIG. 1a shows one form of gyroscope suited for application of the applicant's invention. Gyroscope body 1 is generally triangular in shape. The gyroscope body is formed of a glass or glass-like material, and typically has a low CTE. Passages (not shown) within the gyroscope body link openings in the gyroscope body at each corner. The corners of the gyroscope body are truncated to provide mating surfaces 3, 4 and 5 for a component at each corner. The opening at each corner (not shown) allows optical communication between components. The sides of the gyroscope body provide three remaining mating surfaces 6, 7 and 8. In the gyroscope shown, mating surfaces 4 and 5 have mated thereto adjustable mirror units 9 and 10 comprised of a Zerodur material. Mating surface 3 has mated thereto a readout mirror 11, also of Zerodur. On the sides of the gyroscope, cathode 12 is mated to mating surface 7, and anodes 13 and 14 are mated to mating surfaces 6 and 8, respectively. The cathode and anodes are composed of an aluminum-type material. Sub-passages (not shown) are connected to the passages between the corners of the gyroscope body, and optically connect the cathode and anodes to each other and to the components at the corners.

FIG. 1b shows a detailed view of one of the bonds, contemplated by the applicants. Between component 14 and substrate 1, is an alloy layer 15. The alloy is sandwiched by two layers of mating material 16 and 17. In the preferred embodiment, the alloy material is a gold-indium alloy and the mating material is chrome. FIG. 1c shows a alternate structure created by the applicant's method. In this structure, a layer of one of the bonding materials 18 used to form the alloy and a layer of alloy 19 are sandwiched between two layers of chrome 20 and 21. The excess bonding material in the bond, as will be described shortly, although not necessary, ensures that the bond will have the best possible operating range.

While a detailed view of only one of the bonds is shown, the applicant intends that the detailed views of FIGS. 1b or 1c would be the same for any of the component-substrate bonds of gyroscope 1.

Mating material layers 16 and 17 in FIG. 1b and mating material layers 20 and 21 in FIG. 1c are preferable, but may be optional if the bonding characteristics of the component and the substrate to the alloy are acceptable without these layers. In the preferred embodiment, which uses a gold-indium alloy and a Zerodur substrate, the chrome is preferably included, however.

A more detailed description of the characteristics of various layers is now provided. Gyroscope body 1, which may be called, and will be referred to as the substrate may be quartz, glass, or another glass-like substance which has a low CTE suitable for ring laser gyroscopes. Two common materials used in the area of ring laser gyroscopes are Zerodur and Cervit. In the preferred embodiment the gyroscope body is formed from Zerodur.

Mating material layers 16, 17 and 20, 21, as indicated, are chrome in the preferred embodiment. The chrome layer, provides excellent bonding characteristics to Zerodur, the alloy materials—gold and indium, and the component materials—aluminum and Zerodur. Rather than attempting to match the CTE of the materials in the bond, the chrome layer thickness is chosen to be thin enough so that the stress on the chrome caused by CTE discrepancies is negligible. It is contemplated that the chrome may be replaced with another mating material having similar properties to that of chrome. The chosen mating material should however, exhibit better bonding characteristics to the materials it is adjacent to, than the adjacent materials would have to each other. For example, in the preferred embodiment, gold and indium do not bond well to glass. Chrome on the other hand bonds well to both these materials.

In a proper structure, the mating material layer may be eliminated entirely if the quality of the bond between the bonding materials used and the glass substrate and the component meet the designer's quality requirements. A number of mating materials may also be employed if a single material cannot be found which bonds well to both adjacent materials. Use of graded mating materials, which allow matching of CTE's is also contemplated.

The alloy layer is composed of first and second bonding materials. Typically, one of the two materials will have a melting temperature substantially lower than the other. In the applicants' planned method, one of the bonding materials will diffuse into the other at a temperature below the melting temperature of either bonding material. The alloy produced will have a melting temperature higher than the melting temperature of the bonding material having the low melting temperature.

For, example, gold-indium is the preferred composition of the alloy layer. The melting temperature of gold is 1064° C. and the melting temperature of the indium is 156° C. If the two are mated at approximately 40° C. to 90° C., one will diffuse into the other to form an alloy having a melting temperature of at least 232° C. but which may be as high as 450° C., significantly above the melting temperature of Indium. As will be described later, the alloy layer forms by a so called Solid Liquid Inter-Diffusion (SLID) process, not previously contemplated in the ring laser gyroscope field.

Other materials which may be used for the alloy may include combinations of gold-silver, silver-lead or tin-indium or other combinations which are adaptable to a SLID process. Material for the components may include glass similar to the material 18 of the substrate, aluminum or aluminum containing metals, or other materials. In the preferred embodiment, the components are variously comprised of aluminum and Zerodur.

While the structure depicted in FIG. 1b is the ideal structure, FIG. 1c depicts a more realistic structure, based on current processing technologies. A layer of either bonding material will be formed adjacent the alloy layer 19 and one of the mating material layers 20 or 21 during processing. In FIG. 1c, the bonding material layer, indicated by numeral 18, is shown as formed between layers 19 and 20. This layer is due to the planned exhaustion of one of the bonding materials before exhaustion of the other bonding material during bond formation.

By making sure that the exhausted bonding material is the bonding material having the lowest melting temperature, the operating range of the bond, and thus the gyroscope is increased, since the bonding process ensures that the lowest melting temperature material is fully consumed into the alloy. This makes the bond usable to near the melting temperature of the alloy.

As an example, in the preferred embodiment, the alloy is comprised of gold and indium. Indium has a melting temperature of 156° C. and gold has a melting temperature of 1064° C. Thus, when selecting bonding material thickness, the designer selects the gold layer to be of sufficient thickness to guarantee that the indium is completely diffused. The margin of error used to ensure this occurs results in a thin layer of gold which is not diffused with indium.

A similar process should be used with other compounds chosen for the alloy. For example, a lead-silver bond using the applicants' technique should include excess silver to prevent a layer of lead in the bond. For tin-indium, excess tin should be used to prevent a layer of indium.

A preferred method of the applicant's invention is now described. Initially, the substrate and the components undergo separate processing. FIGS. 2a–2c show the steps in the preferred method of processing the gyroscope body or substrate according to the applicant's invention. Substrate 10 is prepared for processing as is known in the art, such as by cleaning and polishing. The substrate is subsequently vacuum deposited with chrome layer 11. Typical thickness for this layer may be 100 Å, but as indicated earlier, the thickness of the chrome layer is important only insofar as it is negligibly affected by thermal expansion. A layer of gold 12 is next deposited on chrome layer 11 of approximately 500 Å by vacuum deposition.

Additions of layers which form the structure of the applicants' invention herein described need not be produced by vacuum deposition. The process used should however produce homogeneous layers free of defects which would reduce the layers' effectiveness as a seal. It is for instance contemplated that vacuum deposition techniques such as electron beam vacuum deposition process, sputtering processes, CVD processes, MOCVD processes or the like, are all possible processes for forming the necessary layers.

Processing similar to that applied to the substrate occurs for the component. Referring to FIGS. 3a–3c, a component 20 is prepared for processing as is known in the art. The component is subsequently vacuum deposited with chrome layer 21, having a similar thickness to that of the chrome layer 11 on the substrate. A layer of indium 22 is deposited on chrome layer 21 of approximately 250 ÅA. Due to the low melting temperature of the indium, it is necessary for the gold layer to be sufficiently thick to ensure absorption of all of the indium. This requirement, as indicated earlier, prevents a layer of indium from remaining in the bond after processing. The ratio which has been determined to be effective is a 2:1 ratio of gold to indium.

In the final and crucial step of the process, shown in FIG. 4a, the component-chrome-indium structure is pressed against the substrate-chrome-gold structure at slightly higher than atmospheric pressure, and at a temperature between 40° C. and 90° C. (below the melting temperature indium), for approximately twelve hours.

The specified pressure and time given for the bonding process are not critical to the process itself however. The critical aspect of the process is the temperature used. Chemically, the temperature chosen should raise the area of contact between gold layer 12 and indium layer 22 during the final processing step above the melting temperature of the eutectic binary alloy of the two compounds. One of skill in the art may recognize this final step is a Solid liquid Inter Diffusion (SLID) process. For a more complete understanding of SLID bonding techniques, reference is made to: "Applications of Solid Liquid Inter Diffusion (SLID) bonding integrated-circuit applications", by L. Bernstein et al., Transaction of the Metallurgical Society, vol. 236, Mar. 1966, pp. 405–412. Furthermore, U.S. Pat. No. 5,106,009 to Humpston et al. is hereby incorporated by reference as describing several possible SLID alloys and the suggested processing conditions for those alloys. It is noted however, that use of the above described steps, without further information, are sufficient for one of skill in the art to practice the applicants' invention.

Processing the substrate and component may occur simultaneously or the two may be processed sequentially. Also, cleaning and preparation of surfaces in the process have been omitted since normal methods understood by those skilled in the art would be used. For example, is it known that the substrate and the component surfaces should be sufficiently clear of impurities to allow an effective bond to the chrome, but do not require the cleaning necessary for an optical contact.

FIG. 4b shows the structure resulting from the preferred method of the applicant's invention. An alloy layer 30, is formed, a portion of gold layer 12 remains, and indium layer 22 of FIG. 4a has been absorbed completely into alloy layer 30.

Those skilled in the art will recognize that only the preferred embodiment of the present invention has been disclosed herein, and that the embodiment may be altered and modified without departing from the true spirit and scope of the invention as defined in the accompanying claims. Specifically, while gold and indium have been described as the materials of choice for use in the applicant's invention, other alloys mentioned may also be used if bonding process temperatures are chosen which are suitable for the selected bonding materials.

What is claimed is:

1. In a ring laser gyroscope, a method of forming a bond between a substrate and a component, wherein the substrate and the component each have mating surfaces at which the bond may be formed, comprising the steps of:
   (a) depositing a layer of gold on a first mating surface;
   (b) depositing a layer of indium on a second mating surface; and
   (c) pressing the layer of gold to the layer of indium at a temperature of approximately 40 to 90 degrees Centigrade at slightly higher than atmospheric pressure, the layer of gold and the layer of indium thereby forming a gold-indium alloy to serve as the bond between the mating surfaces of the substrate and the component.

2. The method of claim 1 wherein step (c) comprises a SLID process.

3. The method of claim 1, wherein the layer of gold and the layer of indium are deposited using at least one vacuum deposition technique selected from the group consisting of an electron beam vacuum deposition process, a sputtering process, a CVD process, and an MOCVD process.

4. The method of claim 1, wherein the layer of gold has a thickness of approximately 500 Angstroms, and wherein the layer of indium has a thickness of approximately 250 Angstroms.

5. The method of claim 1, wherein the layer of gold and the layer of indium are selected such that there is substantially a two-to-one ratio of gold to indium.

6. The method of claim 1, wherein the layer of gold is provided in excess of an amount necessary to alloy with the layer of indium.

7. The method of claim 1, further comprising:

depositing a first layer of mating material to the first mating surface prior to depositing the layer of gold to the first mating surface; and depositing a second layer of mating material to the second mating surface prior to depositing the layer of indium to the second mating surface.

8. The method of claim 7, wherein the mating material has a thickness that is substantially smaller than the thicknesses of the layer of gold or the layer of indium, thereby making negligible any difference in coefficients of thermal expansion.

9. The method of claim 7, wherein the layer of gold has a thickness of approximately 500 Angstroms, wherein the layer of indiumn has a thickness of approximately 250 Angstroms, and wherein the first and second layers of mating material have a thickness of approximately 100 Angstroms.

10. The method of claim 7, wherein the mating material is chrome.

11. A method for attaching a component to a body of a ring laser gyroscope, wherein the component and the body each include respective mating surfaces, comprising in combination:

depositing a first mating material layer on a first mating surface;

depositing a second mating material layer on a second mating surface;

depositing a layer of gold on the first mating material layer;

depositing a layer of indium on the second mating material layer, wherein the layer of indium has is substantially thinner than the layer of gold; and pressing the layer of gold against the layer of indium at a temperature of approximately 40 to 90 degrees Centigrade, thereby forming a gold-indium alloy to attach the component to the body at the mating surfaces of the component and body.

12. The method of claim 11, wherein the first mating material layer and the second mating material layer are chrome layers.

13. The method of claim 11, wherein the layer of gold has a thickness of approximately 500 Angstroms, and wherein the layer of indium has a thickness of approximately 250 Angstroms.

14. The method of claim 11, wherein the layer of gold and the layer of indium are selected such that there is substantially a two-to-one ratio of gold to indium.

15. The method of claim 11, wherein the layer of gold is provided in excess of an amount necessary to alloy with the layer of indium.

16. The method of claim 11, wherein the layer of gold has a thickness of approximately 500 Angstroms, wherein the layer of indium has a thickness of approximately 250 Angstroms, and wherein the first mating material layer and the second mating material layer each have a thickness of approximately 100 Angstroms.

* * * * *

UNITED STATES PATENT AND TRADEMARK OFFICE
CERTIFICATE OF CORRECTION

PATENT NO. : 6,234,378 B1  Page 1 of 1
DATED : May 22, 2001
INVENTOR(S) : Carol M. Ford and William P. Platt It is certified that error appears in the above-identified patent and that said Letters Patent is hereby corrected as shown below:

Title page,
Item [62] should be added titled: "Related U.S. Application Data" and contain the following text: -- Division of co-pending application No. 08/927,246 filed September 11, 1997. --

Column 1,
Line 5, the following text should appear as a new paragraph:
"This is a division of co-pending Application No. 08/927,246, filed September 11, 1997."

Signed and Sealed this

Fifth Day of March, 2002

Attest:

JAMES E. ROGAN
Attesting Officer  Director of the United States Patent and Trademark Office